May 3, 1955 V. F. ZAHODIAKIN 2,707,661
PISTON RINGS
Filed Dec. 23, 1952 3 Sheets-Sheet 1
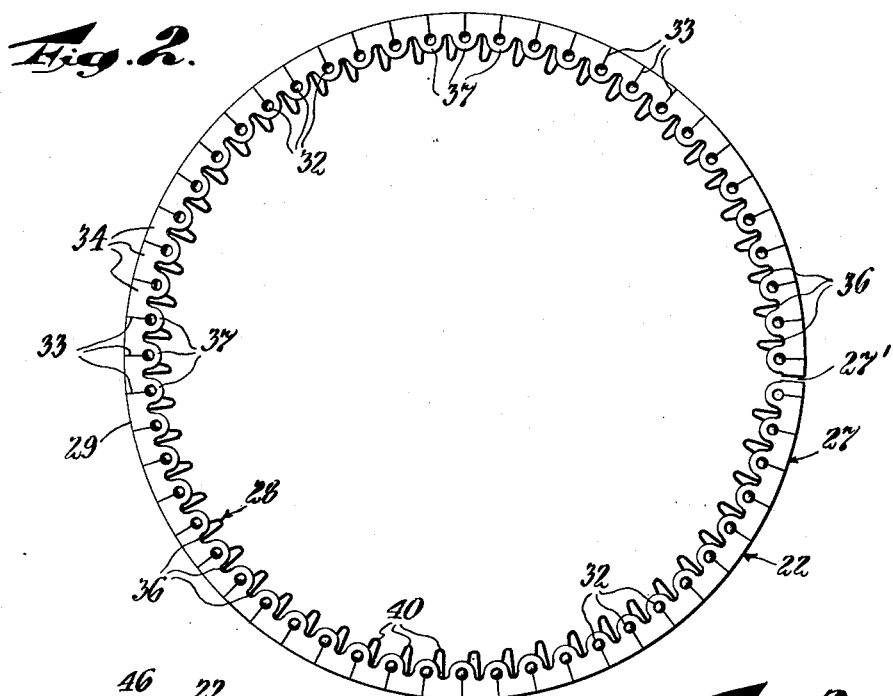
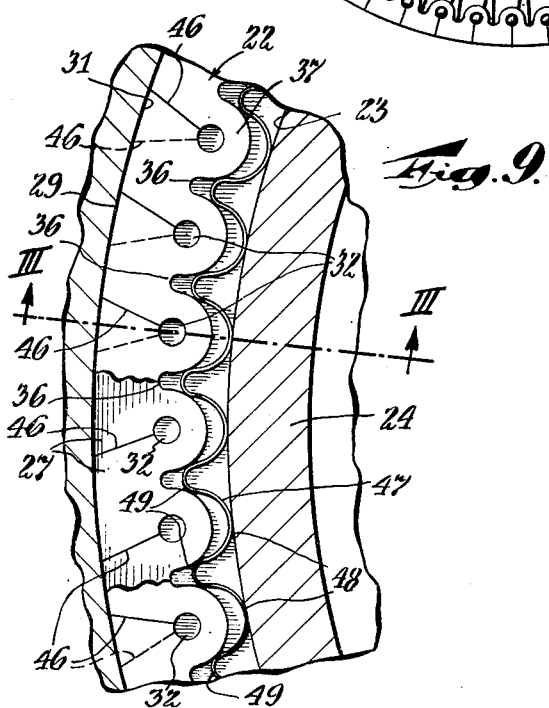
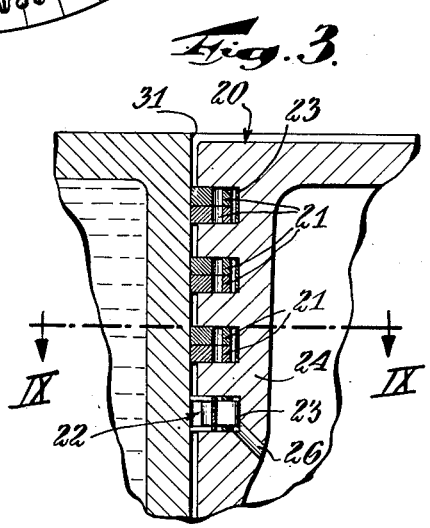
INVENTOR
*VICTOR F. ZAHODIAKIN*
BY
Howard P. King
ATTORNEY

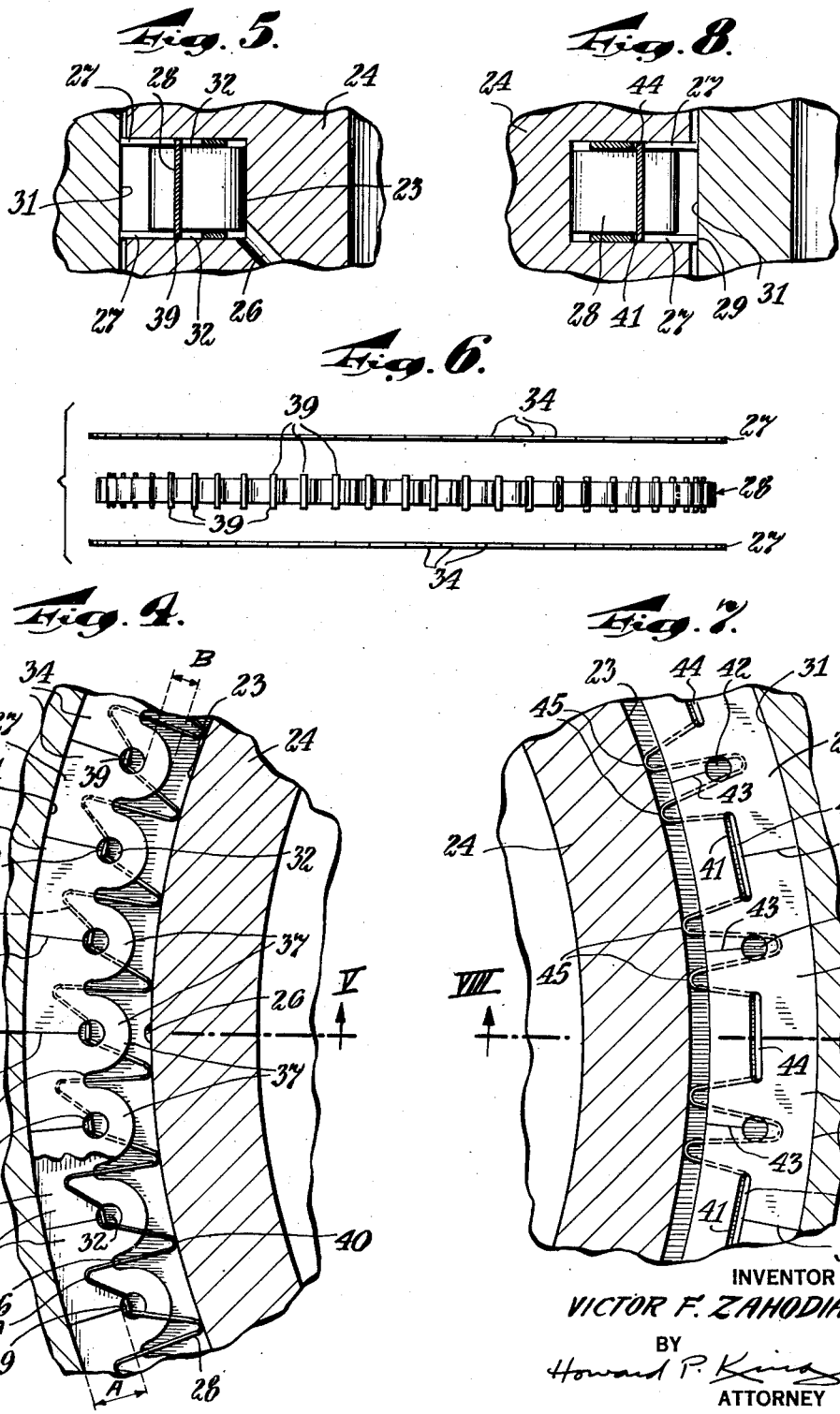

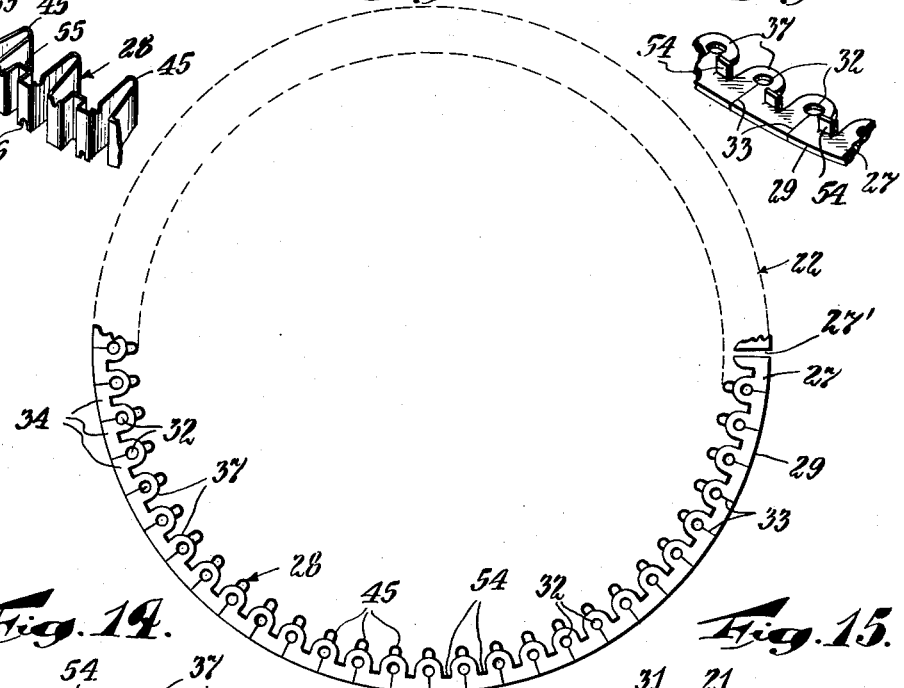

United States Patent Office 2,707,661
Patented May 3, 1955

2,707,661

PISTON RINGS

Victor F. Zahodiakin, Summit, N. J.

Application December 23, 1952, Serial No. 327,470

8 Claims. (Cl. 309—45)

The present invention relates to flexible rings, and more particularly, to piston rings which are used for oil control or which are used to prevent the escape past the piston of gas and compression from the combustion chamber of an internal combustion engine.

Piston rings must be extremely flexible so that intimate contact between the ring and cylinder wall will be assured. Thus where the purpose of the ring is to scrape excessive oil from the cylinder wall, the scraping edge of the ring must closely follow the contours of the cylinder wall. These contours will vary, due to distortion, as the temperature of the cylinder varies and as wear occurs during the operation of the engine. Compression rings must also have intimate contact with the cylinder wall around the periphery of the ring in order to prevent the escape of gases and pressure from the combustion chamber during the operation of the engine.

Therefore the principal object of my invention is to provide a piston ring of improved flexibility without sacrifice of strength.

A further object of my invention is to provide a piston ring of improved flexibility having improved means to uniformly bias the periphery of the ring into intimate contact with the cylinder wall.

Yet another object of the invention is to provide for predetermined pliability of the ring, and more specifically, to provide a perforate scallop wherein the material thickness of the scallop governs the flexibility.

Another object of the invention is to provide a ring having segmental contact with the cylinder wall and to apply pressure at a part radially outward beyond the innermost part of the ring.

A still further object of the invention is to provide a ring which is economical to manufacture and assemble.

The above objects, and other objects which will become apparent as the description proceeds, are accomplished by providing a ring comprised of two spaced annular members having circumferentially spaced apertures therein axially parallel to the ring axis, and means to uniformly bias the outer periphery of the annular members into engagement with the cylinder wall.

The following description will be best understood by reference to the accompanying drawings of preferred embodiments of my invention wherein like numerals of reference refer to similar parts throughout the several figures of the drawings in which:

Fig. 1 is an elevational view of a piston ring constructed in accordance with my invention;

Fig. 2 is a plan view of the ring of Fig. 1;

Fig. 3 is a fragmentary vertical sectional view of a piston and cylinder of an internal combustion engine showing the use of compression and oil-control rings;

Fig. 4 is a fragmentary cut-away cross-sectional view of a piston and cylinder and showing a portion of an oil-control ring of my invention in plan;

Fig. 5 is a sectional view through the piston ring of Fig. 1 taken along line V—V of Fig. 4;

Fig. 6 is an exploded side view of the elements of the piston ring of Fig. 1 showing the elements in position for assembly;

Fig. 7 is a sectional view similar to Fig. 4 and showing a modified construction of a piston ring constructed according to my invention;

Fig. 8 is a cross-section on line VIII—VIII of Fig. 7;

Fig. 9 is a sectional plan similar to Figs. 4 and 7 and taken on line IX—IX of Fig. 3, showing a portion of a compression ring of my invention;

Fig. 10 is an elevational view similar to Fig. 1 and showing a modified construction of oil-control ring;

Fig. 11 is a plan of the ring of Fig. 10;

Fig. 12 is a perspective of a portion of the resilient spacer of the ring of Fig. 10 and Fig. 11;

Fig. 13 is a fragmentary perspective view of one of the ring members according to the modified construction of Figs. 10 and 11;

Fig. 14 is an enlarged sectional plan similar to Figs. 4, 7 and 9 showing a portion of the ring of Figs. 10 and 11; and Fig. 15 is a cross-section of piston, cylinder and rings on line XV—XV of Fig. 14.

The piston ring of Fig. 1 is especially adapted for use an an oil-control ring. As illustrated in Fig. 3, pistons are generally provided with a plurality of rings which are set in individual grooves in the periphery of the piston to retain compression and properly control the lubrication of the cylinder bores. The primary function of the lowermost ring, termed an oil-control ring, is to scrape the excess oil from the cylinder wall and return it to the crankcase or other reservoir while the primary function of the other rings is to prevent the escape of gas and pressure from the combustion chamber. Thus the piston 20 of Fig. 3 is provided with compression rings 21 and an oil control ring 22. Each ring is set in a substantially horizontal groove 23 of rectangular cross-section in skirt 24 of the piston 20. The oil control ring 22 is lowermost and its groove 23 is connected to the oil reservoir by a series of drain outlets 26 running from the lowermost groove 23 through the skirt of the piston.

The oil control ring 22, constructed according to my invention, is comprised generally of two annular spaced members 27 separated by a resilient spacer 28, as best illustrated in Figs. 5 and 6. The outer peripheral surfaces 29 of the annular members 27 are adapted to scrape the excess of oil from the wall 31 of the cylinder in which the piston operates. These annular members 27 may be conveniently formed of a high carbon steel ribbon and after hardening will provide long-wearing scraping surfaces.

The flexibility of each annular member is increased by a series of apertures 32, preferably circular, although other desired forms may be used. Said apertures are spaced one from another along each annular member 27 on a circle concentric with the annular member between the inner and outer peripheries thereof. The apertures 32 may be termed axial apertures, since their axes are parallel to the axes of the annular members. Slits 33, preferably radial, run from the outer periphery of each annular member 27 to the aperture 32. Each annular member 27 has a slit 27′ to permit convenient assembly and allow expansion and contraction of the ring during operation of the engine.

Thus the oil scraping surface 29 is divided into a plurality of segments 34 capable of relative movement with respect to each other, thereby providing a ring which is flexible in its own plane and which has a segmental oil scraping edge that can follow irregularities in the cylinder wall.

The flexibility of each annular member 27 may be further increased and the pliability predetermined, according to my invention, by scalloping the inner periphery of the member. Thus midway between each aperture 32 is a radial notch 36 cut in the inner periphery of the annular member. Adjacent notches are joined by a scallop 37 the center of curvature of which is concentric with the aperture 32 between the notches. Thus every point on the periphery of the scallop 37 is equidistant from the aperture 32 concentric with the particular scallop. The constant thickness of material between the apertures and the inner periphery of the annular member imparts desired uniform pliability to the member. Preferably the radial notches 36 terminate on a circle with a radius to meet the radius of scallops 37.

The annular members 27 are spaced apart by a resilient spacer 28. The spacer 28 of Figs. 1 to 8 has tongues 39 extending from each edge thereof which fit into the apertures 32 of the annular members 27. Preferably, the tongues on each edge are aligned so that the apertures 32 of the two annular members will be opposite each other, as shown, for instance, in Fig. 5 of the drawing. The spacer 28 is of generally wavy character and as one example illustrated by Fig. 4, considering an increment of length from one tongue 39 to the next, is approximately Z- or N-shaped, and in Figs. 7 and 14 is approximately M- or W-shaped. The structure therefore provides humps or loops 40 of the Z, N, M or W formation extending inwardly beyond the inner periphery of the annular member and adapted to bear against the bottom of piston groove 23 in which the ring is seated in use. The biasing force of the spacer bearing against the bottom of the groove 23 will be transmitted by the tongues 39 to the annular members 27, as shown on Fig. 4, and will force them radially outward into intimate engagement with the cylinder wall 31. The tongues 39 are transversely symmetric to and intercept the same radius of the annular member 27 as the corresponding slit 33, as shown in Fig. 4, so the force applied by the tongue will be uniform in its action on the segments of the member 27 bordered by the particular slit 33. The outwardly projecting loops 40A are positioned closer to the outer periphery of the member 27 than to the inner periphery of member 27 for the purpose of vertical support of the members 27.

Fig. 7 illustrates a modified form of an oil-control ring constructed in accordance with my invention. The flexibility of each annular member 27 of the piston ring is increased by slots 41 spaced one from each other in a circular series along the annular member 27. A radial slit 33 runs from the center of slot 41 to the outer periphery of the annular member dividing the oil scraping surface 29 into a plurality of segments 34 as in the case of the ring of Figs. 1–6. Between each pair of adjacent slots 41 is an aperture 42 which has a radial slit 43 running from the aperture to the inner periphery of the annular member 27. The inner periphery is thus divided into a plurality of segments which enables the ring to flex inwardly as well as outwardly from its normal position wherein the sides of each slit are touching.

The slots 41 in the two annular members are aligned in a direction parallel to the axis opposite each other by tongues 44 which fit the slots 41. The tongues 44 are joined by a wavy resilient spacer shown this time as approximately W-shape and having tongues 44 which are an integral part of the spacer. Two humps 45 of the W-shaped tension spacer extend beyond the inner periphery of the annular members and are adapted to bear against the bottom of the groove 23 to bias the annular members outwardly into engagement with the cylinder wall. As in the first described embodiment, the tongues in each slot 41 exert equal pressures on the two segments against which the tongue bears and therefore provide absolutely uniform radial pressure. The elongated form of slot 41 greatly facilitates the flexibility of the ring.

The embodiment of my invention shown in Fig. 9 is intended primarily for use as a compression ring. The compression ring is comprised of two annular members 27 which are back to back. Each annular member has apertures 32 therethrough in an axial direction spaced one from each other along the member. The apertures lie on a circle concentric with the annular member. As in the first embodiment, between adjacent apertures is a radial notch 36 running upwardly from the inner periphery to increase the flexibility of the member and adjacent notches 36 are joined by a concentric scallop 37 providing for pliability of the member.

Each annular member 27 also has a slit 46 running from each aperture 32 to the outer periphery of the member. The outer periphery is thus divided into a plurality of segments. The slits 46 differ from the slits 33 of the previous embodiment in that each slit makes an acute angle with a radius of the annular member 27 on which the center of its corresponding aperture lies. When the compression ring is assembled, the apertures 32 in the juxtaposed members are aligned or register with each other, but the slits 46 of the bottom annular member 27 are preferably offset from the slits 46 of the upper annular member 27 so that the gases in the combustion chamber are not allowed to escape which may occur if corresponding slits 46 in the top and bottom annular member were in a common plane. More specifically, the bottom member 27 is provided with slits 46 which make a different angle with their corresponding radii of the annular members than do the slits 46 of upper member, both angles being in the same direction, for instance clockwise from the radius. As noted above, the corresponding radius for a particular slit 46 is the radius of the annular member which passes through the center of the aperture 32 into which the slit 46 opens. Thus in the preferred embodiment, the slits 46 of the upper annular member 27 make an angle of approximately 160° with its corresponding radius, while those of the lower annular member make an angle of approximately 200°.

In order to bias the annular members 27 of the compression ring outwardly into engagement with the cylinder wall, a sinuous spring 47 is provided which is comprised of a series of inward loops 48 the adjacent loops of which are joined by a smaller outward loop 49. The outward loop 49 fits between scallops 37 of the annular members 27 which are in alignment and the larger inward loops 48 bear against the bottom of the groove 23 in which the ring is seated.

While the foregoing description has referred to tongues on the spacer engaging in recesses in the ring members, this relationship may be reversed and tongues on the members may engage in recesses or declivities in the spacers, this relationship being more especially illustrated in Figs. 10 to 15, inclusive. Here, as in the preceding disclosures, the ring is comprised of two ring members 27 spaced in parallelism by an intervening tension spacer 28. The outer periphery 29 of each member constitutes an edge for engagement with the cylinder wall 31. Again, a circular series of apertures 32 are provided in the members with the corresponding apertures, one overlying another, being aligned on axes parallel to the axis of the ring. Slits 33 extend in radial directions from each aperture to the outer periphery of the member, and thus the member is divided into a circular series of segments 34 juxtaposed ends of which are in abutting relationship to each other to constitute a substantially continuous edge surface. The segments are successively integral with each other by a continuity of the metal from segment to segment around the apertures next the inner peripheral part of said members, by virtue of scallops 37.

The scallops 37 are spaced from each other at the basal part of their valleys, and the metal thereat is bent perpendicular to the plane of the member to provide a protruding tongue 54 thereat, the tongues being in a cylindrical series. The tongues of the upper member project downwardly whereas the tongues of the lower member project upwardly, and are in pairs projecting axially toward each other. From a manufacturing standpoint, it is easier to provide these tongues 54 on said members than to provide heretofore described tongues 39 and 44 on the spacer. Furthermore, the fabrication of the spacer and assembly of the ring are simplified by the presently described construction of tongues on the members.

It is now appropriate to point out that the top and bottom edges of the spacer each lie in a plane common with the general plane of the juxtaposed face of the respective member. The circular configuration of the spacer provides a series of successive loops, of which there are long humps or loops 45 projecting radially inwardly of the ring and intervening short humps or loops 55 the hollows of which engage against the pairs of tongues 54 of the members. By virtue of the flexibility of the members and the resiliency of the spacer, the segments are individually pressed toward the cylinder wall and will follow the irregularities thereof to maintain sealing contact therewith. Oil passages 56 may be appropriately located in the spacer, for instance, at the top and bottom edges thereof, as shown.

I claim:

1. A piston ring, comprising an annular member having scallops the wavy walls whereof cumulatively constitute the inner periphery of said member, each scallop having an aperture therein and the member being divided into segments outwardly from each aperture, pliability of the ring being predetermined by the material thickness from the apertures to their respective scallop walls.

2. A piston ring comprising two annular members and means to bias said members radially outward, each of said members having axial apertures spaced one from another along said member and having slits running from said apertures to the outer periphery of said member, each member having a notch extending between successive slits from the inner periphery of said member, and scallops joining adjacent notches and concentric with the aperture embraced by said scallop.

3. An oil-control piston ring comprising two spaced annular members and a resilient spacer separating the same, each of said members having axial apertures spaced one from another along said member, radial slits running from each of said apertures to the outer periphery of said annular member and dividing the outer peripheral margin of said member into a plurality of segments, tongues carried by said spacer fitting into and aligning the apertures of said spaced members, each of said apertures having a tongue therein and each of said tongues bearing upon adjacent segments bordering the aperture into which it fits for applying uniform pressure to both ends of each segment, and said spacer having loops between successive tongues, said loops extending inwardly of said members and adapted to bear against the bottom of a piston groove in use.

4. A piston oil-control ring comprising two annular members, the outer periphery of each member being adapted to scrape oil from a cylinder wall, a resilient spacer interposed between said members, each of said members being substantially identical and having apertures spaced one from each other in a circular series along said member with radial slits running from each aperture to the outer periphery of said member, and dividing the outer periphery into a plurality of segments, said members having radial notches running to the inner periphery of said member between each pair of adjacent apertures, a scallop joining adjacent notches, said scallop being concentric with the aperture it embraces, and tongues carried by said resilient spacer fitting into and aligning the apertures of said spaced members, said tongues bearing equally upon the segments bordering the aperture into which it fits, the spacer between said tongues being approximately Z- or N-shaped and having a loop extending inwardly of the inner periphery of said members.

5. A piston oil-control ring comprising two annular members, the outer periphery of each member being adapted to scrape oil from a cylinder wall, a resilient spacer interposed between said members, each of said members being substantially identical and having apertures spaced one from each other in a circular series along said member with radial slits running from each aperture to the outer periphery of said member, and dividing the outer periphery into a plurality of segments, said members having radial notches running to the inner periphery of said member between each pair of adjacent apertures, a scallop joining adjacent notches, said scallop being concentric with the aperture it embraces, and said members and spacer having interconnecting means at said notches for applying an outward bias on said members by said spacer, the spacer between said means being approximately M- or W-shaped and having a loop extending inwardly of the inner periphery of said members.

6. A piston ring comprising parallel annular members each having an inner periphery with scallops and valleys in radial directions and having an outer circular periphery, said members having apertures within said scallops thereby predetermining pliability of said members, and said members having slits from said apertures directed radially of the member and outwardly away from said scallops whereby said members are each comprised of a plurality of segments interconnected by the material of said scallops, biasing means between said members, and said members and biasing means having cooperative interconnection whereby the biasing means will exert expanding tension on the ring members.

7. A piston ring comprising two spaced annular split members having outer peripheries adapted to scrape oil from a cylinder wall, a resilient spacer interposed between said members, each of said members being substantially identical and having apertures spaced one from each other in a circular series along said member with radial slits running from each aperture to the outer periphery of said member and dividing the outer periphery into a plurality of segments, said members having radial notches running to the inner periphery of said members, between each pair of adjacent apertures, a scallop joining adjacent notches, said scallop being concentric with the aperture it embraces, and tongues carried by said resilient spacer fitting into and aligning the apertures of said spaced members, said tongues bearing equally upon the segments bordering the apertures into which it fits, the spacer between said tongues being of wavy shape and having loops extending outwardly from tongue positions toward but without reaching the outer periphery of said members and thereby spaced away from the cylinder wall in use, and said inward loops extending beyond the internal periphery of said members and thereby adapted to be in contact with the bottom of oil groove in use.

8. A piston ring comprising parallel annular members each having a radial split and an inner periphery with scallops and valleys in radial directions and having an outer circular periphery, said members having apertures within said scallops thereby predetermining pliability of said members by volume of material in said scallops and said members having slits from said apertures directed radially of the member outwardly away from said scallops whereby said members are each comprised of a plurality of segments interconnected by the material of said scallops, biasing means between said members, and said members and biasing means having cooperative interconnection whereby the biasing means will exert expanding tension on the ring members.

References Cited in the file of this patent

UNITED STATES PATENTS

| 2,387,084 | McFall et al. | Oct. 16, 1945 |
| 2,560,667 | Stevenson | July 17, 1951 |
| 2,560,668 | Stevenson | July 17, 1951 |

FOREIGN PATENTS

| 123,352 | Great Britain | Feb. 17, 1919 |